United States Patent
Sabouri-Sichani et al.

(10) Patent No.: US 10,945,175 B2
(45) Date of Patent: Mar. 9, 2021

(54) RACH-LESS FALLBACK TO TWO-STEP OR FOUR-STEP RACH WITH UL GRANT

(71) Applicant: Nokia Technologies Oy, Espoo (FI)

(72) Inventors: Faranaz Sabouri-Sichani, Aalborg (DK); Ahmad Awada, Munich (DE); Rakash SivaSiva Ganesan, Munich (DE); Jedrzej Stanczak, Wroclaw (PL); Thomas Hohne, Helsinki (FI); Anup Talukdar, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 5 days.

(21) Appl. No.: 16/516,418

(22) Filed: Jul. 19, 2019

(65) Prior Publication Data

US 2021/0022057 A1    Jan. 21, 2021

(51) Int. Cl.
*H04W 4/00* (2018.01)
*H04W 36/08* (2009.01)
(Continued)

(52) U.S. Cl.
CPC .......... *H04W 36/08* (2013.01); *H04W 72/14* (2013.01); *H04W 74/02* (2013.01);
(Continued)

(58) Field of Classification Search
CPC ..... H04W 36/08; H04W 72/14; H04W 74/02; H04W 74/0833; H04W 76/18; H04W 76/27

See application file for complete search history.

(56) References Cited

U.S. PATENT DOCUMENTS

2006/0239229 A1* 10/2006 Marinescu ........ H04W 36/0022
370/331
2009/0215459 A1* 8/2009 Kuo .................... H04W 74/002
455/436

(Continued)

OTHER PUBLICATIONS

ZTE Corporation et al.; "New work item: 2-step RACH for NR"; RP-182894; 3GPP TSG RAN Meeting #82; Sorrento, Italy; Dec. 10-13, 2018; whole document (5 pages).

*Primary Examiner* — Elisabeth Benoit Magloire
(74) *Attorney, Agent, or Firm* — Harrington & Smith (57) ABSTRACT

In accordance with example embodiments of the invention there is at least a method and apparatus to perform at least receiving, by a network device of a communication network, information providing an indication to connect to a network node of the communication network using a Random Access Channel (RACH)-less signaling procedure; determining that connecting to the network node using the RACH-less signaling procedure has failed; and based on the RACH-less signaling procedure failing, using at least one alternative signaling procedure for connecting to the network node using uplink (UL) resources from RACH-less procedure. Further, in accordance with example embodiments of the invention there is at least a method and apparatus to perform based on a RACH-less signaling procedure from a network device failing to connect to a network node, receiving, by the network node, at least one alternative signaling procedure from the network device for the connecting; and establishing a connection with the network device based on the at least one alternative signaling procedure from the network device using the UL resources from RACH-less procedure.

32 Claims, 7 Drawing Sheets

(51) Int. Cl.
*H04W 72/14* (2009.01)
*H04W 76/27* (2018.01)
*H04W 74/08* (2009.01)
*H04W 76/18* (2018.01)
*H04W 74/02* (2009.01)

(52) U.S. Cl.
CPC ....... *H04W 74/0833* (2013.01); *H04W 76/18* (2018.02); *H04W 76/27* (2018.02)

(56) References Cited

U.S. PATENT DOCUMENTS

| | | | | |
|---|---|---|---|---|
| 2011/0117905 A1* | 5/2011 | Huang | ............... | H04W 36/0083 |
| | | | | 455/422.1 |
| 2011/0310845 A1* | 12/2011 | Jung | ................... | H04W 36/385 |
| | | | | 370/331 |
| 2018/0020382 A1* | 1/2018 | Kim | ................ | H04W 36/0055 |
| 2019/0090156 A1* | 3/2019 | Kim | ........................ | H04L 69/04 |
| 2019/0110300 A1* | 4/2019 | Chen | ......................... | H04B 7/00 |
| 2019/0223073 A1* | 7/2019 | Chen | ................. | H04W 36/0058 |
| 2019/0289544 A1* | 9/2019 | Yi | ..................... | H04W 72/0413 |

* cited by examiner

RACH-LESS FALLBACK TO TWO-STEP OR FOUR-STEP RACH WITH UL GRANT

TECHNICAL FIELD

The teachings in accordance with the exemplary embodiments of this invention relate generally to a device fallback to an alternative signaling procedure from a RACH-less procedure for access a target network node or cell; and, more specifically, relate to novel operations to provide a device fallback from a RACH-less procedure that has failed to another RACH procedure such as but not limited to a four-step RACH (i.e., legacy RACH) or a two-step RACH (introduced in Release 16 work item; RP-182894) procedure for access to a target network node or cell.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted being prior art by inclusion in this section.

Certain abbreviations that may be found in the description and/or in the Figures are herewith defined as follows:

| | |
|---|---|
| BFR: | beam failure recovery |
| CBRA: | contention based random access |
| CFRA: | contention-free random access |
| CHO: | conditional handover |
| CP: | cyclic prefix |
| C-RNTI: | cell radio network temporary identifier |
| CSI-RS: | channel state information - reference Signal |
| gNB: | next generation NodeB and/or base station |
| HO: | handover |
| HOF: | handover failure |
| PDCCH: | physical downlink control channel |
| PUSCH: | physical uplink shared channel |
| PRACH: | physical random access channel |
| RACH: | random access channel |
| RAR | random access response |
| SCG: | secondary cell group |
| SI: | system information |
| TA: | timing advance |
| TMSI: | temporary mobile subscriber identity |

In conventional systems, a base station (e.g., an eNB or gNB) can initiate a random access process e.g., by transmitting a Physical Downlink Control Channel (PDCCH) order instructing a User Equipment (UE) to initiate a random access process. Such a random access process can be used for the UE to connect to a target node for a device such as a UE to connect to a target node (e.g., source eNB or gNB) such as for handover or a Secondary Cell Group (SCG) change.

In such conventional systems a random access process involves the source base station transmitting a message to the target base station (e.g., to initiate a handover request) and signaling uplink resources provided to the UE for the random access process.

At the time of this application there is work being done to specify new mobility enhancement solutions for performing similar operations for such handover or Secondary Cell Group (SCG) changes with less interruption time and improved robustness.

Example embodiments of the invention as disclosed herein work to at least improve on a random access process and these new mobility enhancement solutions.

SUMMARY

In an exemplary aspect of the invention, there is a method comprising receiving, by a network device of a communication network, information providing an indication to connect to a network node of the communication network using a Random Access Channel (RACH)-less) signaling procedure that does not use a random access channel procedure; determining that connecting to the network node using the RACH-less signaling procedure has failed; and based on the RACH-less signaling procedure failing, using at least one alternative signaling procedure for connecting to the network node.

In another exemplary aspect of the invention, there is an apparatus comprising at least one processor; and at least one memory including computer program code, where the at least one memory and the computer program code are configured, with the at least one processor, to cause the apparatus to at least: receive, by a network device of a communication network, information providing an indication to connect to a network node of the communication network using a RACH-less signaling procedure; determine that connecting to the network node using the RACH-less signaling procedure has failed; and based on the RACH-less signaling procedure failing, use at least one alternative signaling procedure for connecting to the network node.

In another exemplary aspect of the invention there is a method, comprising: based on a RACH-less signaling procedure from a network device failing to connect to a network node, receiving, by the network node, at least one alternative signaling procedure from the network device for the connecting; and establishing a connection with the network device based on the at least one alternative signaling procedure from the network device.

In accordance with still another exemplary aspect of the invention there is an apparatus comprising at least one processor; and at least one memory including computer program code, where the at least one memory and the computer program code are configured, with the at least one processor, to cause the apparatus to at least: based on a RACH-less signaling procedure from a network device failing to connect to a network node, receive, by the network node, at least one alternative signaling procedure from the network device for the connecting; and establish a connection with the network device based on the at least one alternative signaling procedure from the network device.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments of the invention, there is proposed novel operations to provide a device fallback from a RACH-less procedure that has failed to another procedure such as but not limited to a four-step RACH (legacy RACH) or a two-step RACH procedure for access a target device or cell.

Example embodiments of the invention relate to NR Work Item submitted around the time of this application which aim to specify new mobility enhancement solutions for reducing HO or Secondary Cell Group (SCG) change interruption time and to improve HO robustness in current and future Standards Releases.

When the UE is in RRC_CONNECTED state, handover can be decided by source cell based on received measurement reports from the UE. The inter gNB HO procedure is illustrated in FIG. 1.

Figure 1:
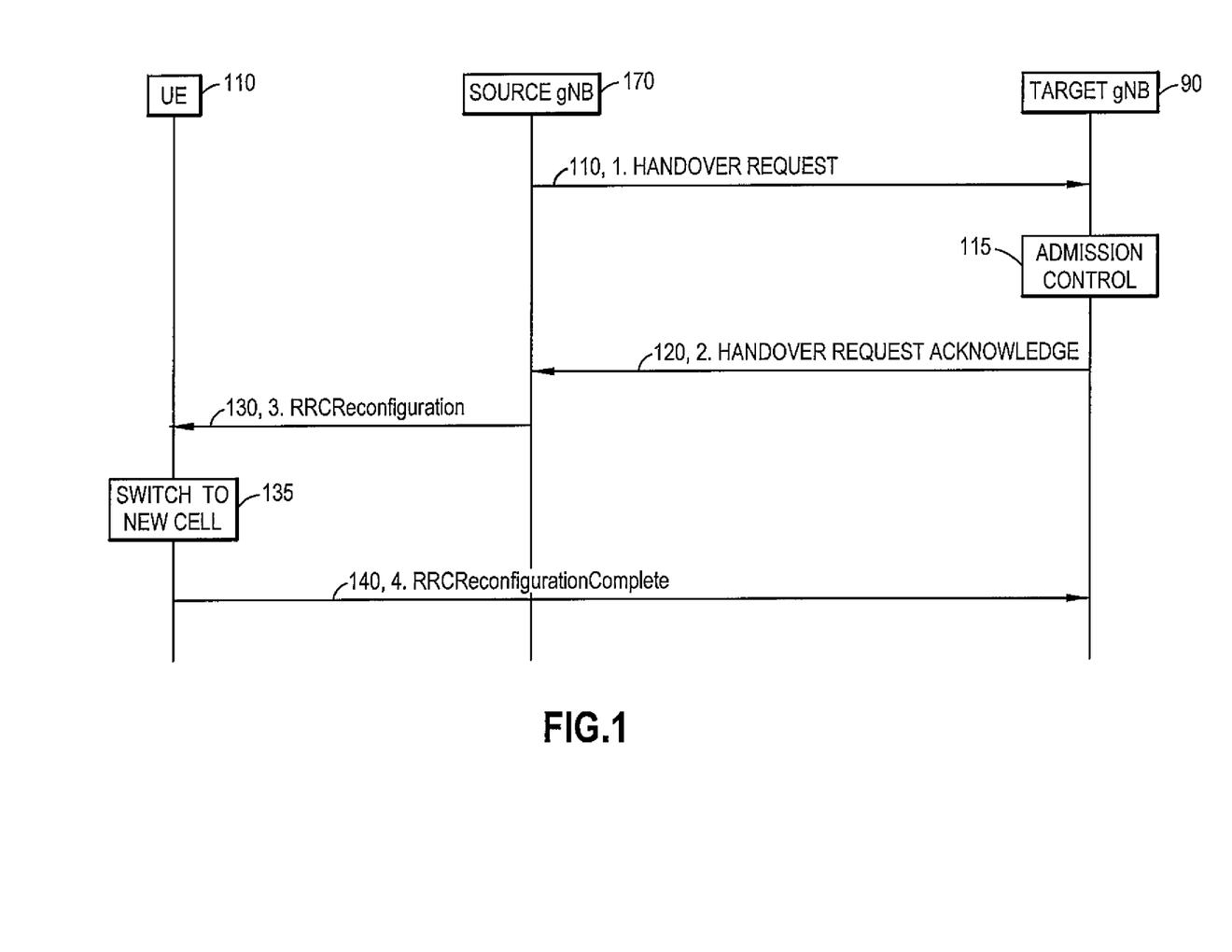
FIG. 1 shows an Inter-gNB handover procedure.

As shown in FIG. 1 there is a UE 110, a source gNB 170 and a target gNB 90. In response to a handover request 110 from the source gNB 170 to the target gNB 90 there is admission control 115 at the target gNB 90. Then as shown in FIG. 1 there is a handover request acknowledge 120 of the handover request sent from the target gNB 90 to the source gNB 170. Then there is then an RRCReconfiguration 130 sent from the source gNB 170 to the UE 110 as shown in FIG. 1. Following this the UE 110 performs a switch to a new cell 135 as shown in FIG. 1. In step 140 of FIG. 1 the UE 110 sends an RRCReconfiguration complete message to the target gNB 90.

The RRC Reconfiguration 130 message is the HO command containing the information required to access the target cell 13, containing at least the target cell ID, the new C-RNTI, and the target gNB security algorithm identifiers for the selected security algorithms. It can also include a set of dedicated RACH resources that are associated either with SSBs or CSI-RS, common RACH resources, and system information of the target cell, etc.

In FIG. 1, on the UE 110 side upon the reception of handover command (RRCReconfiguration 130), the UE 110 starts timer T304 which will be stopped upon successful completion of handover execution (i.e. when the UE 110 receives ACK from gNB 90 for its RRCReconfiguration-Complete message 140. The timer T304 can start at reception of RRC Connection Re-configuration message such as one that includes a Mobility Control message for a handover or a secondary cell group connection. Then if the timer T304 expires (i.e. the handover is not completed before the time is elapsed), the UE 110 declares handover failure and initiates RRC Re-establishment procedure.

RACH-Less Handover

RACH-less HO is one method that can be used to reduce service interruption which was adopted in LTE Release 14.

In digital communication that is wired or wireless, an important precondition is to establish the timing synchronization between the receiver and transmitter. So an important aspect is a synchronization mechanism that is designed for the specific RACH related communication.

RACH-less HO allows UE to acquire a target cell such as an access target cell without performing a random access procedure (sending PRACH preamble and waiting for receiving Random Access Response (RAR)). Basically, the timing advance (TA) of target gNB can be configured for the UE to be either 0 (e.g. small cells) or equal to the values of the source gNB (for co-located cells). It has been discussed recently in 3GPP Rel. 16 that the target cell can set any value for the TA based on e.g. statistics collected from previous RACH attempts or prior-knowledge about the network deployment, i.e., left for network-implementation. Using the provided TA, UE will then skip the first two steps of RACH and send RRC Reconfiguration Complete to target gNB on the dedicated UL grant which it has acquired using either of the two alternatives as listed below:

Option 1: Semi-persistent/Periodic pre-allocated UL grant on PUSCH that is already provided to the UE in HO command received from source gNB; or Option 2: After receiving the HO command, UE monitors PDCCH of the target gNB/cell to check for the scheduling of the UL grant.

Figure 2:
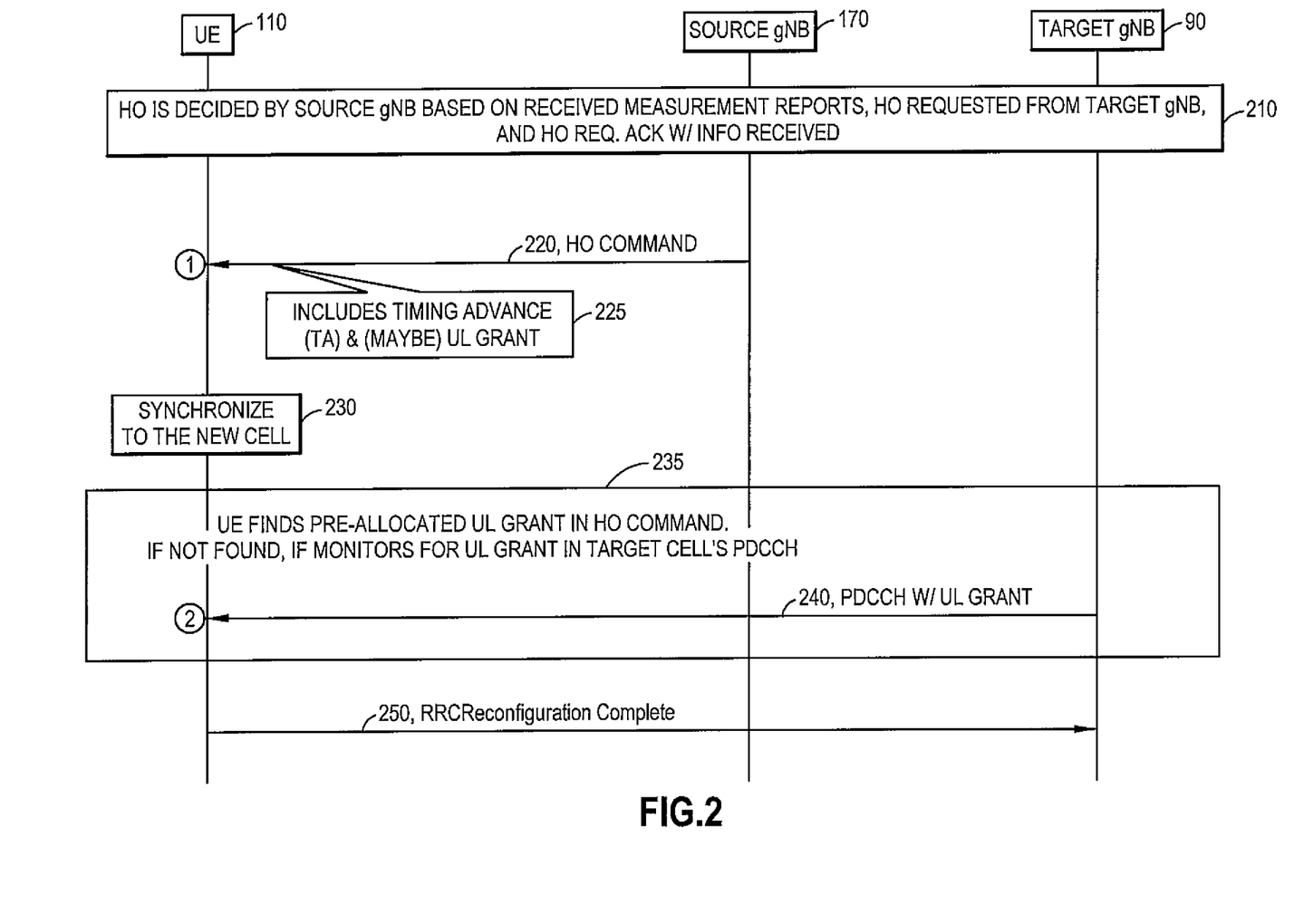
FIG. 2 shows a simplified signaling for RACH-less handover procedure.

A simplified message sequence for RACH-less procedure is shown in FIG. 2. As shown in note 210 of FIG. 2 the handover (HO decided by the source gNB) 170 is based on received measurement reports, the HO requested from target gNB 90, and a HO ACK with information received. As shown in step 220 of FIG. 2 there is a $1^{st}$ step of the RACH-less procedure where the source gNB 170 sends a HO command 220 to the UE 110. As shown in note 225 of FIG. 2 the HO command 220 includes a timing advance (TA) and possibly an uplink (UL) grant. Then as shown in step 230 the UE 110 synchronizes to the new cell. Note 235 of FIG. 2 shows that the UE 110 finds pre-allocated UL grant(s) in the HO command 220, but if not found the UE 110 monitors for UL grant(s) in a PDCCH of a cell of the target gNB 90. As shown in step 240 of FIG. 2 a PDCCH from target node B in which the UE can find UL grant(s) for a case such as the UE 110 has not been received in HO command. Then as shown in step 250 of FIG. 2 the UE 110 is sending RRCReconfigurationComplete utilizing the retrieved TA and UL grant and skipping the RACH procedure.

In NR multi-beam system, the periodic UL grant that is provided by the target gNB in the handover command or the UL grant that is scheduled on PDCCH could be associated to specific set of SSBs or CSI-RSs. In both cases, the pre-defined set of beams is synched with the UE during the handover preparation phase: Herein, the UE would report the relevant beam measurements of the target cell to the source cell which will then forward them to the target cell. Based on the received beam measurements, the target cell can associate an UL grant with the relevant set of SSBs or CSI-RSs and convey the configuration to the UE in the handover command, i.e., each SSB or CSI-RS is transmitted using a distinct beam pointing to a specific direction.

In work items progressed at the time of this invention, 2-step RACH is discussed for 3GPP NR Release 16. The work items aim to specify 2-step RACH as general MAC procedure covering both physical layer and higher layer aspects. Two-step RACH procedure will reduce the latency of RACH procedure as compared to the current 4-Step RACH procedure used in Release 15 (and before) and is targeting general RACH procedure for different use cases in IDLE, INACTIVE, as well as CONNECTED RRC modes. Hence, it is clear that this approach will reduce the interruption time spent on RACH procedure during handover, and in turn enhance UE mobility.

Only contention based RACH procedures are so far specified for 2-step RACH. Possible extensions to contention-free two-step RACH may be considered in future Releases. All triggers for Rel-15 NR 4-step RACH are also applied for 2-step RACH except for System Information (SI) Request and Beam Failure Recovery (BFR) which are still under discussion in RAN2. No new trigger for 2-step RACH is being considered.

Basically, the 2-Step RACH procedure condenses the preamble and Msg3 from 4-Step RACH into MsgA which consists of a preamble and PUSCH occasion for sending uplink data. Similarly, RACH response and Msg4 from 4-Step RACH are condensed into a single MsgB. This 2-Step RACH procedure is shown in FIG. 3 (right side) together with the legacy 4-step RACH procedure (left side of FIG. 3).

It is noted that the use of the term 2-step and two-step, and the use of the term 4-step and four-step which may be used interchangeably in this application, and such use of these terms is not limiting to any operations disclosed in this application.

Figure 3:
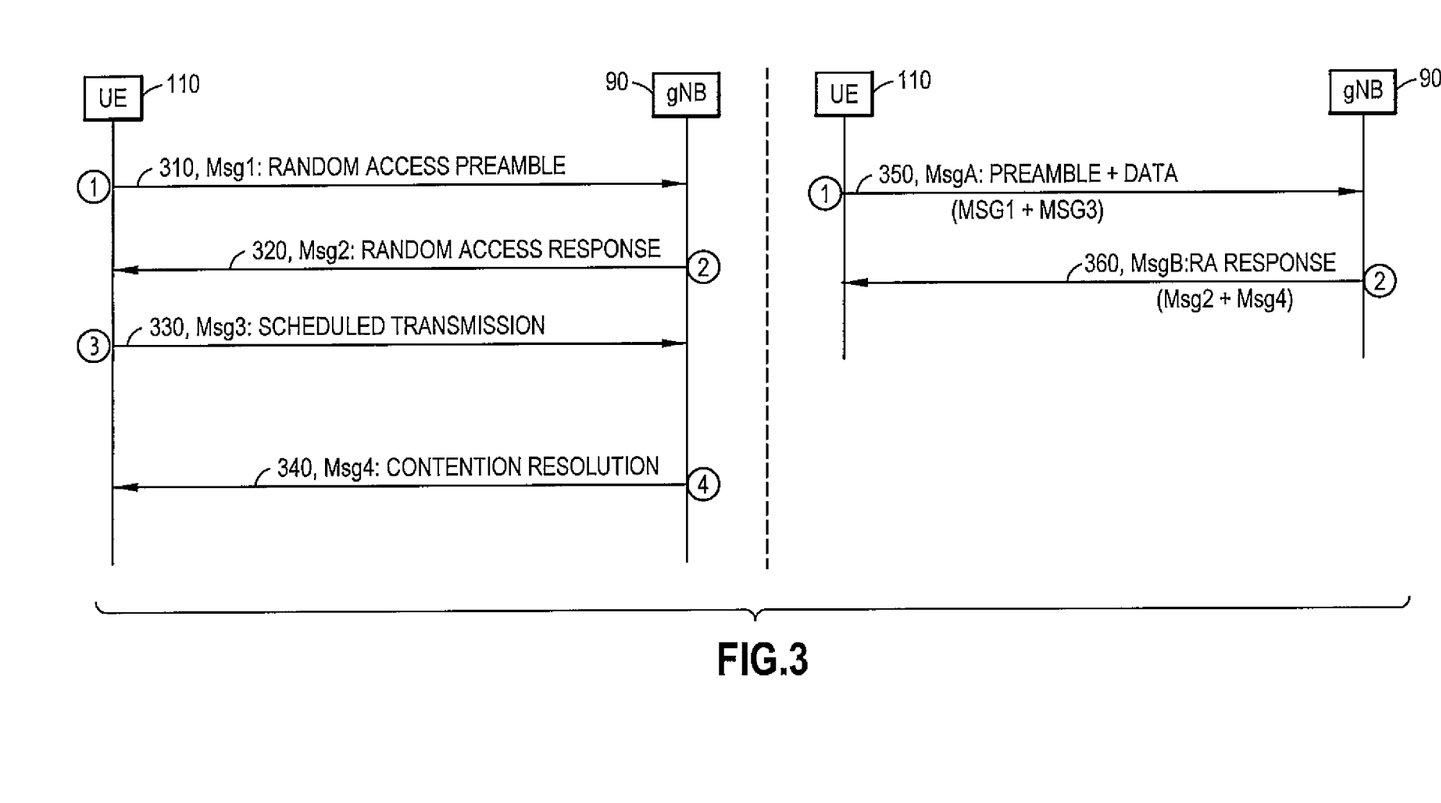
FIG. 3 shows a RACH procedure in 4-step and 2-step.

As shown in a $1^{st}$ step of the legacy 4-step RACH procedure of FIG. 3 there is shown in step 310 of FIG. 3 where a msg1: random access preamble is communicated between the UE 110 and the gNB 90. In a next step of the legacy 4-step RACH procedure of FIG. 3 there is shown in step 320 of FIG. 3 where the gNB 90 sends towards the UE 110 msg2: random access response. In a another step of the legacy 4-step RACH procedure of FIG. 3 there is shown in step 330 of FIG. 3 where the UE 110 sends towards the gNB 90 msg3: scheduled transmission or payload. Then a final step of the legacy 4-step RACH procedure of FIG. 3 there is shown in step 340 of FIG. 3 where the gNB 90 sends towards the UE 110 msg4: contention resolution.

As shown in a $1^{st}$ step of the 2-Step RACH procedure of FIG. 3 there is shown in step 350 of FIG. 3 where a MsgA: preamble and data are communicated between the UE 110 and the gNB 90. As shown in FIG. 3 this step 350 of FIG. 3 combines features of Msg1 and Msg3 of the legacy 4-step RACH procedure as discussed above. Then as shown in a next step of the 2-Step RACH procedure of FIG. 3 there is shown in step 360 of FIG. 3 where a MsgB: RA response is communicated from the gNB 90 to the UE 110. As shown in FIG. 3 this step 360 of FIG. 3 combines features of Msg2 and Msg4 of the legacy 4-step RACH procedure as discussed above.

It is noted that the PRACH preamble part of MsgA is transmitted on the RACH occasion while the payload is sent on PUSCH. The two parts are associated together. Each RACH preamble will have a mapping in time and frequency to a PUSCH occasion. The data transferred in PUSCH occasion identifies the UE as well as the reason for initiating RACH.

The RACH preambles of MsgA are known orthogonal sets of sequences (Zadoff Chu) which are easy to detect because of their orthogonality, even when they are transmitted without prior knowledge of timing advance or required power level. On the other hand, PUSCH occasion part carries payload with UE identifier, Temporary Mobile Subscriber Identity (TMSI). When this payload is transmitted without prior knowledge of timing advance or required power level there is a higher probability that it will not be decoded correctly by the gNB or eNB as compared to RACH preamble. This will lead to higher probability of delay in completing the RACH procedure as the UE will have to retry with higher power levels until its MsgA is finally heard by the gNB or base station.

RACH-less handover procedure may fail if the timing advance (TA) provided by the target cell is not accurate. This becomes particularly relevant in NR and recent LTE Releases (from Rel-16 onwards) where it is being discussed that the target can be set to any TA value that is not necessarily 0 (small cells) or equal to that of the source cell (co-located cells). Hence, if the estimated TA value is not correct the gNB may not detect the RRCReconfigurationComplete (message 3) sent by the UE, and as a result no acknowledgement would be received by the UE.

If timer T304 (timer corresponding to ReconfigurationWithSync, i.e. HO) which is started upon reception of the handover command expires, the UE declares handover failure (HOF) and initiates RRC re-establishment procedure to another suitable cell. As a result, the complete procedure introduces longer interruption compared to the case if the UE had successfully performed the RACH access and completed the handover.

Example embodiments of the invention as disclosed herein can apply RACH-less handover for asynchronous NW in E-UTRAN, for LTE, and can be also applied in NR.

It is noted that it has been discussed in NR and LTE that the UE may fallback to 4-step CBRA procedure if RACH-less handover fails before the expiry of timer T304. In addition, it has been proposed that if none of the UL grants associated with SSBs or CSI-RS can be used (SSBs or CSI-RS are no longer detected sufficiently by the UE), the UE can immediately fallback to 4-step CBRA. This fallback may help the UE to complete the RACH using another procedure before declaring handover failure.

In accordance with example embodiments of the invention it is assumed that RACH-less handover is configured for the UE and the UE has acquired a TA from the target gNB as well as UL grant in the received HO command (or target node's PDCCH in case it was not received with HO command) to use for sending RRCReconfigurationComplete (as equivalent for Message 3 in a RACH procedure).

In this document there is in accordance with example embodiments of the invention proposed fallback methods.

In one method in accordance with the example embodiments there is proposed that if a RACH-less handover fails within a pre-configured time duration T (lower than T304 value) or for a pre-configured number of trials on specific UL grants (e.g., the first N UL grants), the UE utilizes the remaining periodic UL grant(s), that were originally configured for RACH-less handover, to perform two-step RACH procedure. That is the UE would use that UL grant for sending the payload part of Message A (corresponding to message 3 in legacy 4-step RACH) along with the RACH preamble after the expiry of time duration T or after the first N UL grants are passed without success. Herein, the network does not need to provide two separate UL grants for RACH-less and two-step RACH.

After the expiry of timer T or after the time duration used for the first N UL grants, the UE would automatically fallback to two-step RACH and start utilizing the information and allocated resources from the target NB which it has received in HO command (or target node's PDCCH in case it was not received with HO command) for RACH-less HO procedure.

Key novel aspects of example embodiments of the invention include:
  A fast fallback from RACH-less HO to an "alternative 2-step RACH" is proposed;
  An "alternative two-step RACH" where dedicated UL grant from RACH-less are re-used to perform two-step RACH;

A new timer (T) and/or constant (N) to run in parallel with the HO failure expiry timer, T304; and The recovery (i.e. fallback from RACH-less to 2-step RACH) process does start at timer T expiry (or reaching constant N), instead of awaiting T304 expiry which indicates HO failure.

In another method in accordance with example embodiments of the invention it is proposed that if RACH-less handover fails within time duration T less than T304 or for a pre-configured number of trials on specific UL grants (e.g., the first N UL grants), the UE performs 4-step RACH but uses the remaining UL grant(s) that was originally assigned by the target cell for RACH-less HO for performing one of the following options depending on the received configuration from the handover command.

Option A: The UE may be configured to report beam measurements of the target cell that can be used in beam refinement, or neighbor cell measurement for accelerating the setup of dual connectivity schemes;

Option B: The UE may be configured to use the UL grant to send user data packets that are ciphered using the security key provided by the target cell. As the UL grant is configured specifically for the UE, the target cell should be able in principle to decode the packet if received successfully; and/or Option C: The UE may be configured to send a PRACH preamble on the dedicated UL grant as RACH occasion. In other words, the UE may use the UL grant as dedicated RACH occasion for the random access. This would allow a "contention-free random access" although the UE is using a contention-based PRACH preamble out of the common pool of RACH preambles. The UE may even use a new preamble with shorter length than that of the PRACH preamble. The PRACH preambles used for contention-based RACH are typically longer in order to ensure orthogonality between different preambles transmitted simultaneously by other UEs using the same RACH occasion. However, while using UL grant as a dedicated RACH occasion, the orthogonality requirement is not needed and hence, a shorter length is sufficient. The length of the sequence shall be sufficiently long to enable the gNB to estimate the timing advance.

As there are multiple UL grants (periodic), the UE may perform a combination of the options as well.

In accordance with example embodiments of the invention, after the expiry of timer T or after the time duration for the first N UL grants, the target cell would automatically fallback to two-step RACH or 4-step RACH for the handed over UE, i.e., drop RACH-less HO procedure.

A prerequisite of proposed methods in accordance with example embodiments of the invention include that the UL grant is provided to the UE for a RACH-less HO. The dedicated UL grant is a periodic semi-persistent grant which will be valid until the release of the timer T304 with successful acknowledgement (ACK) RRCReconfigurationComplete (i.e. HO success) or when UE initiates RRC re-establishment upon expiry of T304 (i.e. HO failure).

Further, in another method in accordance with example embodiments of the invention there can be a device fallback to a subsequent procedure such as a 2-step RACH procedure from a current RACH-less procedure for access a target node such as a gNB and/or cell:

fallback to the subsequent procedure when the current RACH-less procedure fails;

the subsequent procedure re-uses the remaining dedicated UL grant(s) scheduled for the current RACH-less procedure to access the target gNB/cell;

fallback to the subsequent procedure from the current RACH-less procedure without requiring a separate dedicated UL grant(s) to be scheduled for the subsequent procedure to access the target gNB/cell;

a new timer T and/or counter constant is set for handling fallback to the subsequent procedure from the current RACH-less procedure;

the new timer T or counter is set a value smaller than T304 timer;

the new timer T our counter starts for the fallback upon reception of Handover commend, running in parallel with T304 timer; and/or the fallback to the subsequent procedure when the new timer T or counter expires Operations in accordance with example embodiments of the invention as disclosed herein can rely on an understanding that having dedicated UL grant from the target cell will provide opportunity for the UE to recover from a potential HO failure encountered during RACH-less HO procedure. Hence, the fallback to 2-step RACH has to be triggered well before T304 timer expiry—at least early enough for a successful two-step RACH or after N unsuccessful (unacknowledged) transmissions at N UL grant occasions, where N is an integer. Therefore, example embodiments of the invention include defining a new timer (e.g., new timer T), and/or a new constant value interpreted as the number of RRCReconfigurationComplete retransmissions.

Further, types of timers as disclosed herein, such as but not limited to the T304 timer (as in the 3GPP specs at the time of this application), a new timer T, and/or a reconfiguration with sync failure expiry timer, can be incorporated or can share a same timer or a same group of timers and/or use a same counter mechanism or same group of mechanisms. In this regard, there can be a same timer or a group of timers that can be controlled independently or controlled together for performing all or select operations associated with timers such as the T304 timer, a new timer T, and/or a reconfiguration with sync failure expiry timer. In addition, any of these timers can be incorporated in separate timers and/or use separate counter mechanisms or devices and there can be independent and/or group control of these separate timers or separate counter mechanisms.

Figure 4:
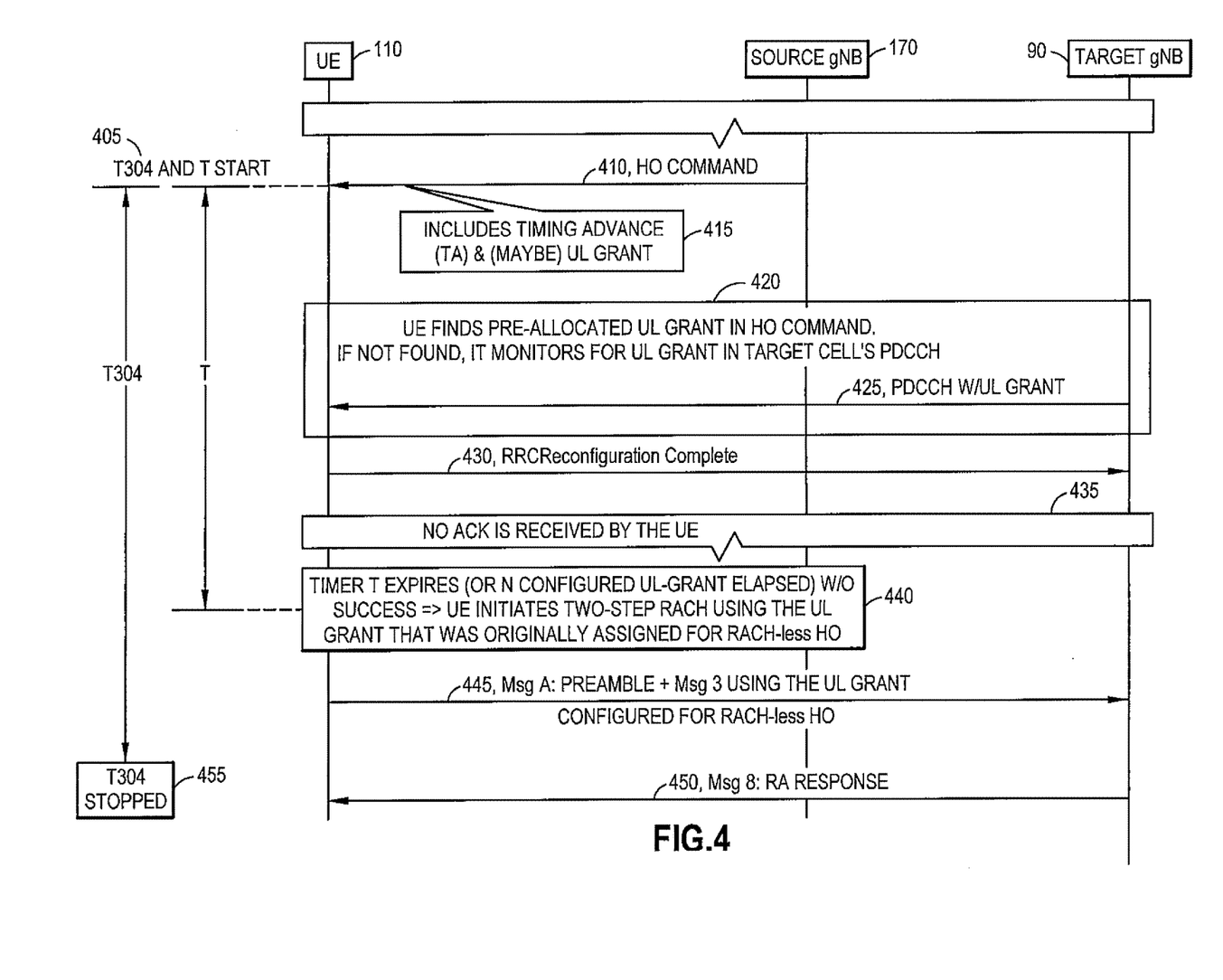
FIG. 4 shows a message sequence chart for RACH-less fallback to 2-step RACH with RACH-less resources.

Operations in accordance with example embodiments of the invention as described herein are depicted in the message sequence chart shown in FIG. 4.

As shown at step 405 of FIG. 4 there is a timer T304 and a timer T or counter start. This step 405 is performed in response to the HO command 410 from the source gNB 170 towards the UE 110. As in note 415 of FIG. 4 it is noted that the HO command 410 includes a timing advance and possibly also UL grant(s). As shown in note 420 of FIG. 4 it is noted that the UE 110 finds pre-allocated UL grant(s) in the HO command 410. But if not found then the UE 110 monitors for UL grant(s) in a cell associated with the target gNB 90. As shown in step 425 of FIG. 4 the target gNB 90 sends to the UE 110 PDCCH with UL grant(s). Then as shown in step 430 of FIG. 4 the UE 110 sends towards the target gNB 90 an RRC reconfiguration complete message. As shown in note 435 of FIG. 4 for a case the timer T or counter expires before ACK is received as shown in step 440 of FIG. 4 then the RACH-less procedure is determined to have failed. As a note, as shown in note 440 of FIG. 4 a failure can result if the timer T or counter expires or if a predetermined number of configured UL grant(s) have elapsed before a success of the RACH-less procedure. In another case, as shown in step 445 of FIG. 4 the MsgA: preamble and Msg3 are transmitted using the UL grant(s) which was configured for a RACH-less HO. At step 450 of FIG. 4 the target gNB 90 sends towards the UE 110 a MsgB: random access (RA) response.

Further, the message sequence chart as shown in FIG. 4 is explained further below:

In the first step, the UE 110 receives a handover command 410 from source gNB 170 containing TA for the target cell and possibly a periodic UL grant for performing RACH-less HO:

In case the UL grant is not provided in HO command, the UE may be configured to monitor PDCCH sent from the target cell for receiving the UL grant;

Upon the reception of the handover command, the UE starts timer T304 and timer T or counter as proposed in accordance with example embodiments of this invention.

Note that in conditional handover (CHO) the UE would start both timers when the CHO execution condition is fulfilled which will trigger the UE to detach from the source cell and access the target cell, i.e., in CHO the UE does not access immediately the target cell after receiving the handover command but waits until another CHO execution condition, configured by the network, to be fulfilled.

In case the UE fails to complete the handover execution within timer T, within the counter constant or within N UL grant occasions, the UE falls back to perform two-step RACH by making use of the UL grant that was provided originally for RACH-less HO.

The 2-step RACH attempt would start based on either of the below options:

Option1: A duration (e.g. size) of the timer T or counter can be configured in the handover command or provided in the system information block;

Option 2: Alternative trigger would be that the UE would start the two-step RACH when it fails to complete the HO execution in the first N UL grants where N is provided in the handover command or system information:

One option does not exclude the other and both parameters can potentially be configured with definition of the trigger based on when the first condition (or both) are met.

Typical network configuration for T304 value is 500 ms to 1 s. The timer value is long enough to allow RACH-less handover first, and then the fallback scheme in case of RACH-less failure within the timer T or counter constant time.

In 2-step RACH, the payload is transmitted in a regular PUSCH, i.e. not a special PUSCH with longer Cyclic Prefix (CP) to accommodate for the TA. Furthermore, there is a pre-configured mapping between the RO and the PUSCH location. When changing the HO procedure from RACH-less to 2-step RACH an association between the dedicated UL grant of RACH-less HO and the contention-based RACH occasion in the two-step RACH may be needed or not depending of the applied options:

Option1: The dedicated UL grant of the RACH-less HO is being used to transmit both the RACH preamble and the payload (Msg3 in legacy). If the payload ('Msg3') is transmitted next to the preamble in the allocated PUSCH, then gNB will be able to easily decode the PUSCH after it detects the preamble. In this case, preamble association is not required;

Option2: If the UE uses the regular RACH occasions of the target gNB and then transmits the 'Msg3' over the allocated PUSCH, the UE may use a CBRA preamble which belongs to a subset which indicates to the gNB that this is a RACH-less fallback to 2-step where the payload is to be found in the RACH-less grant resources. Indication of the preamble association is contained in the chosen preamble subset; and Option3: If the UE uses the regular RACH occasions of the target gNB and then transmits the 'Msg3' over the allocated PUSCH, the indication of the association is essential. The UE may indicate which contention-based preamble it has selected for RACH access or the index of the RACH occasion that it has used for sending the preamble in the payload sent on PUSCH. In other words, information about the association can be provided in the UL grant.

The association will not be an issue in case CFRA preamble is provided in the handover command (to be used in case of RACH-less fallback).

In another method in accordance with example embodiment of the invention as disclosed here there is a device such as a UE fallback to four-step RACH (legacy RACH) procedure from two-step RACH procedure for access a target gNB/cell such as:

fallback to legacy RACH procedure when the current RACH-less procedure fails;

when the current RACH-less procedure fails UE start legacy RACH procedure by re-using the remaining dedicated UL grant(s) scheduled for the RACH-less procedure to access the target gNB/cell;

a new timer T or counter constant is set for handling fallback to legacy RACH procedure from the current RACH-less procedure;

the new timer T or counter is set a value smaller than T304 timer;

the new timer T or counter starts for the fallback upon reception of Handover command, running in parallel with T304 timer; and the fallback to legacy RACH procedure when the new timer T or counter expires These operations similarly can rely on an understanding that having dedicated UL grant from the target cell will provide opportunity for the UE to recover from a potential HO failure encountered during RACH-less HO procedure. Here a proposed a fallback to 4-step RACH triggered is performed after passing the time T (lower than T304's value) or N number of unsuccessful (unacknowledged) UL at N UL grants. Therefore, in accordance with example embodiments of the invention there is defining a new timer and/or a new constant.

Figure 5:
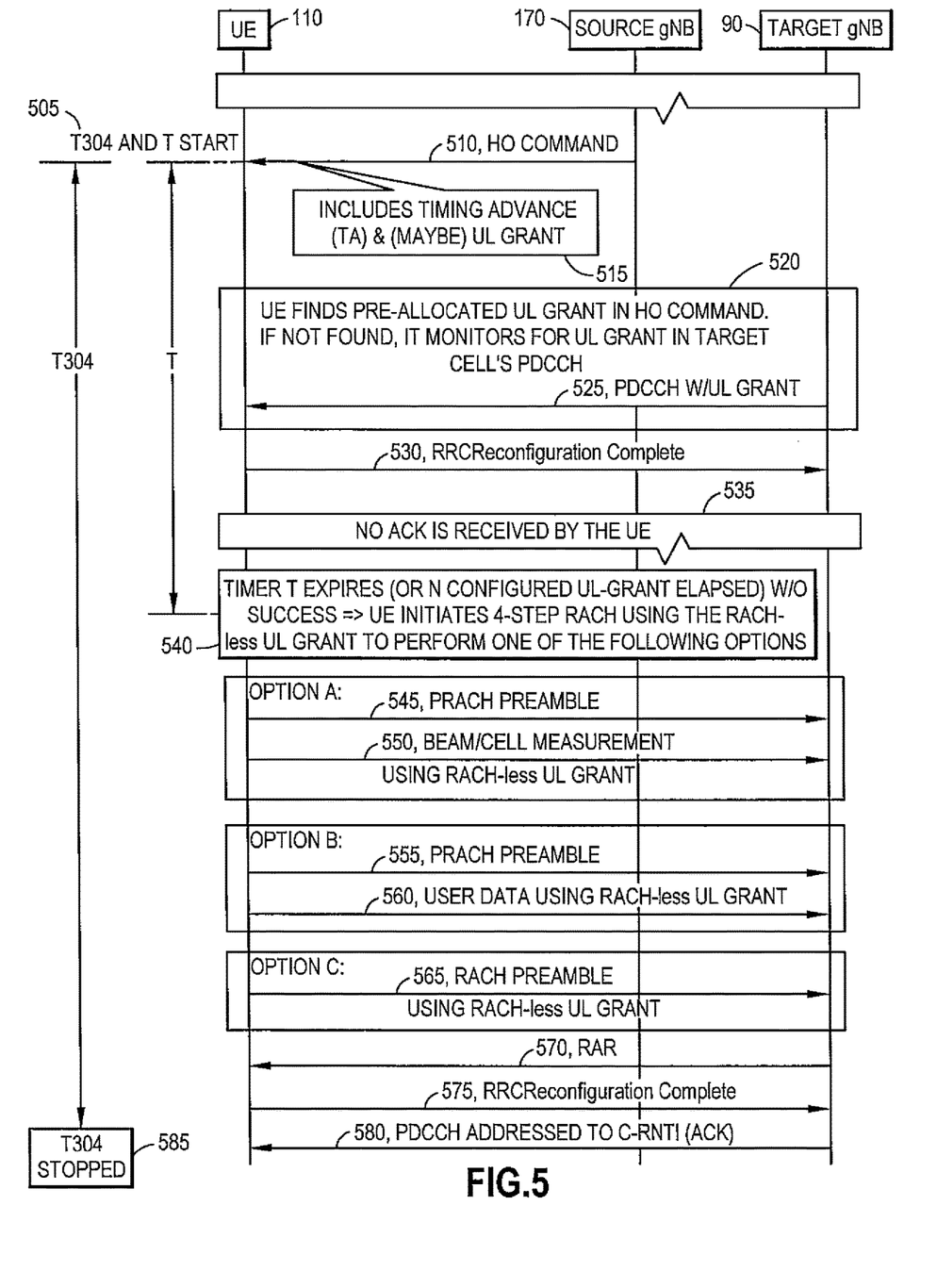
FIG. 5 shows a message sequence chart for RACH-less fallback to 4-step RACH with RACH-less resources.

FIG. 5 shows a message sequence chart for RACH-less fallback to 4-step RACH with RACH-less resources in accordance with example embodiments of the invention.

As shown at step 505 of FIG. 5 there is a timer T304 and a timer T or counter constant start. This step 505 is performed in response to the HO command 510 from the source gNB 170 towards the UE 110. As in note 515 of FIG. 4 it is noted that the HO command 510 includes a timing advance and possibly also UL grant(s). As shown in note 520 of FIG. 5 it is noted that the UE 110 finds pre-allocated UL grant(s) in the HO command 410. But if not found then the UE 110 monitors for UL grant(s) in a cell associated with the target gNB 90. As shown in step 525 of FIG. 5 the target gNB 90 sends to the UE 110 PDCCH with UL grant(s). Then as shown in step 530 of FIG. 5 the UE 110 sends towards the target gNB 90 an RRC reconfiguration complete message.

As shown in step 535 of FIG. 5 for a case no ACK is received (i.e., ACK for indicating success of RRCReconfigurationComplete) before the timer T expires or a predetermined number of configured UL grant(s) are used a failure of RACH-less procedure is indicated. Then as shown in step 540 of FIG. 5 the Timer T expires before a success of a RACH-less signaling procedure, and in this case a 4-step RAC signaling procedure is performed. Then at this point in accordance with example embodiments of the invention three different Options are shown in FIG. 5 of operations that can be performed by the network device:

As shown in step 545 of FIG. 5 for Option A the UE 110 sends towards the target gNB 90 a PRACH preamble, and as shown step 550 of FIG. 5 the UE 110 sends towards the target gNB 90 a Beam/Cell Measurement using RACH-less UL grant; or As shown in step 555 of FIG. 5 for Option B the UE 110 sends towards the target gNB 90 a PRACH preamble, and as shown step 560 of FIG. 5 the UE 110 sends towards the target gNB 90 user data using RACH-less UL grant; or As shown in step 565 of FIG. 5 for Option C the UE 110 sends towards the target gNB 90 a RACH preamble using a RACH-less UL grant.

Then as shown step 570 of FIG. 5 the target gNB 90 sends towards the UE 110 a RAR. In step 575 of FIG. 5 the UE 110 sends towards the target gNB 90 ab RRCReconfiguration Complete message. Then as shown in step 580 of FIG. 5 the target gNB 90 sends towards the UE 110 a PDCCH addressed to C-RNTI (ACK). In addition, it is noted that as shown in step 585 of FIG. 5 the timer T304 or a counter is stopped at step 585 due to completion of the handover.

It is noted that in Option C, the UE may be configured to select a PRACH preamble from a specific set where the length of the PRACH preamble is shorter than CFRA and CBRA resources. This is because the UL grant is dedicated for the UE and orthogonality requirement for the PRACH preamble sequence is not critical and as such it might be sufficient to have a short preamble for timing advance estimation. The specific set of RACH preamble can be provided either in system information or handover command.

Figure 6:
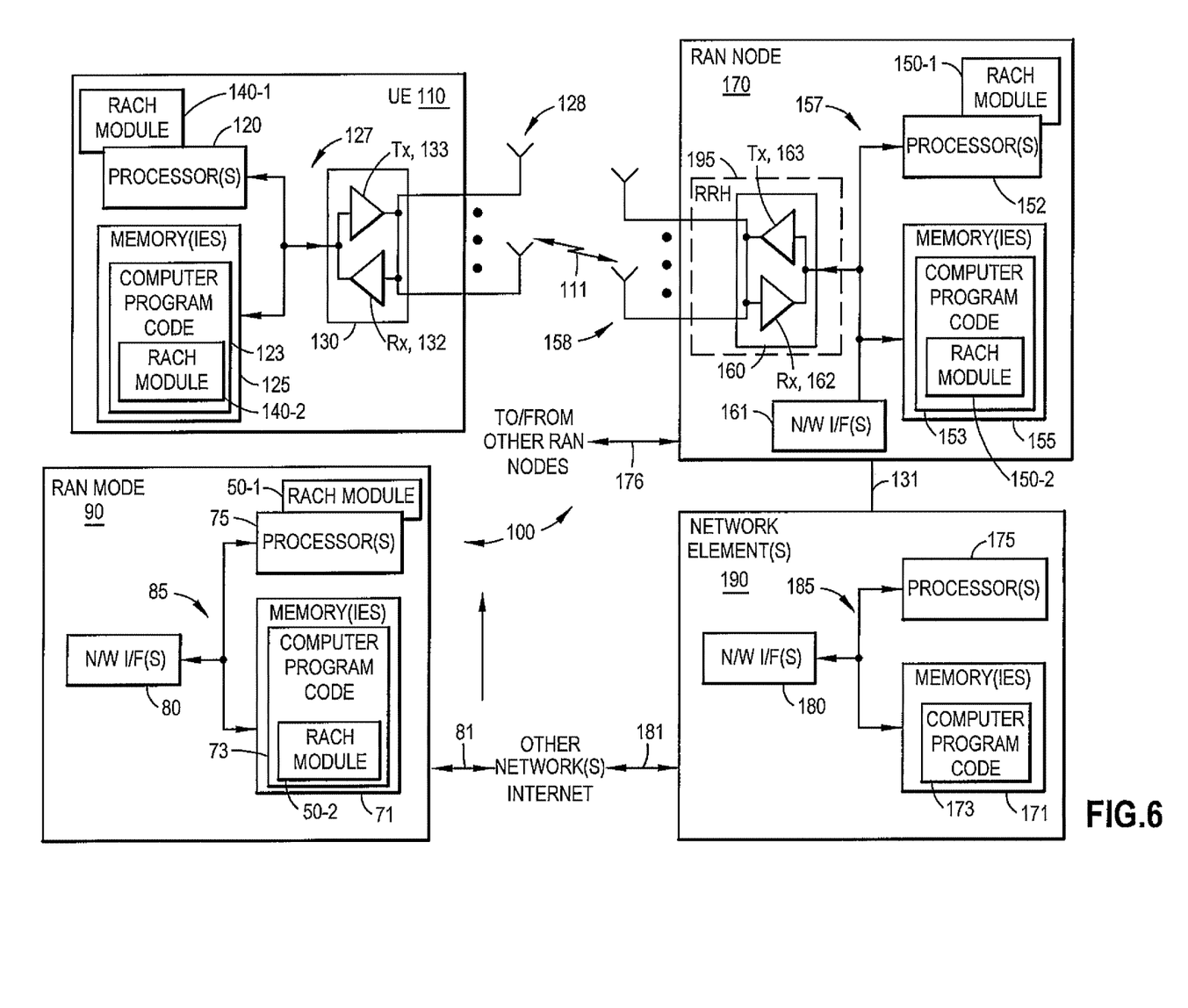
FIG. 6 shows a high level block diagram of various devices used in carrying out various aspects of the invention.

Turning to FIG. 6, this figure shows a block diagram of one possible and non-limiting exemplary system in which the exemplary embodiments may be practiced.

In FIG. 6 a user equipment (UE) 110, radio access network (RAN) node 170, a radio access network (RAN) 90, and network element(s) 190 are illustrated. In FIG. 6, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a RACH module 140, comprising one of or both parts 140-1 and/or 140-2, which may be implemented in a number of ways. The RACH module 140 may be implemented in hardware as RACH module 140-1, such as being implemented as part of the one or more processors 120. The RACH module 140-1 may be implemented also as an integrated circuit or through other hardware such as a programmable gate array. In another example, the RACH module 140 may be implemented as RACH module 140-2, which is implemented as computer program code 123 and is executed by the one or more processors 120. For instance, the one or more memories 125 and the computer program code 123 may be configured to, with the one or more processors 120, to cause the UE 110 to perform one or more of the operations as described herein. The UE 110 communicates with RAN node 170 and/or the RAN node 90 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx, 162 and a transmitter Tx, 163. The one or more transceivers 160 are connected to one or more antennas 158. The one or more memories 155 include computer program code 153.

The RAN node 170 includes a RACH module 150, comprising one of or both parts 150-1 and/or 150-2, which may be implemented in a number of ways. The RACH module 150 may be implemented in hardware as RACH module 150-1, such as being implemented as part of the one or more processors 152. The RACH module 150-1 may be implemented also as an integrated circuit or through other hardware such as a programmable gate array. In another example, the RACH module 150 may be implemented as RACH module 150-2, which is implemented as computer program code 153 and is executed by the one or more processors 152. For instance, the one or more memories 155 and the computer program code 153 are configured to, with the one or more processors 152, to cause the RAN node 170 to perform one or more of the operations as described herein.

Similarly, the RAN node 90 includes one or more processors 75, one or more memories 71, one or more network interfaces (N/W I/F(s)) 80, and though not shown, it is noted that the (N/W I/F(s)) 80 of the RAN node 90 includes one or more transceivers interconnected through one or more buses. Further, each of the one or more transceivers connected to an antenna and including a receiver, Rx, and a transmitter. The one or more transceivers 160 are connected to one or more antennas 158. The one or more memories 71 include computer program code 73 and is executed by at least Processor(s) 75.

The RAN node 90 includes a RACH module 50, comprising one of or both parts 50-1 and/or 50-2, which may be implemented in a number of ways. The RACH module 50 may be implemented in hardware as RACH module 50-1, such as being implemented as part of the one or more processors 75. The RACH module 50-1 may be implemented also as an integrated circuit or through other hardware such as a programmable gate array. In another example, the RACH module 50 may be implemented as RACH module 50-2, which is implemented as computer program code 73 and is executed by the one or more processors 75. For instance, the one or more memories 71 and the computer program code 73 are configured to, with the one or more processors 75, to cause the RAN node 90 to perform one or more of the operations as described herein.

The one or more network interfaces 161 and 80 can communicate over a network such as via the links 176 and/or 81 or 131. Two or more of RAN nodes, such as the RAN node 170 communicate and/or the RAN node 90 may be using, e.g., link 176 or 81. The link 176 may be wired or wireless or both and may implement, e.g., an Xn interface for 5G, an X2 interface for LTE, or other suitable interface for other standards.

The one or more buses such as the one or more buses 157 and/or the one or more buses of RAN node 90 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) such as the RRH 195 for LTE or for gNB implementation for 5G, with the other elements of the RAN node 170 possibly being physically in a different location from the RRH, and the one or more buses 157 could be implemented in part as, e.g., fiber optic cable or other suitable network connection to connect the other elements of the RAN node 170 or the RAN node 90 to an RRH such as the RRH 195.

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells. It is further noted that a single cell may have multiple Transmission Reception Points (TRxPs or TRPs) that are used in order to form the cell.

The wireless network 100 may include a network element 190 or elements that may include core network functionality, and which provides connectivity via a link 81 or link 176 or link 131 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) of the network 100, and note that both 5G and LTE functions might be supported. The RAN node 170 is coupled via a link 131 to a network element 190 and the RAN node 90 is connected via link 181 to the network element 190. The link 131 and/or link 181 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, to cause the network element 190 to perform one or more operations, such as operations in accordance with example embodiments of the invention as described herein.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, 171, and 71 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 171, and 71 may be means for performing storage functions. The processors 120, 152, 175, and 75 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 175, and 75 may be means for performing functions, such as controlling the UE 110, RAN node 170, location server 90, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances (including Internet of Things devices) permitting wireless Internet access and possibly browsing, tablets with wireless communication capabilities, as well as portable units or terminals that incorporate combinations of such functions.

Figures 7A, 7B:
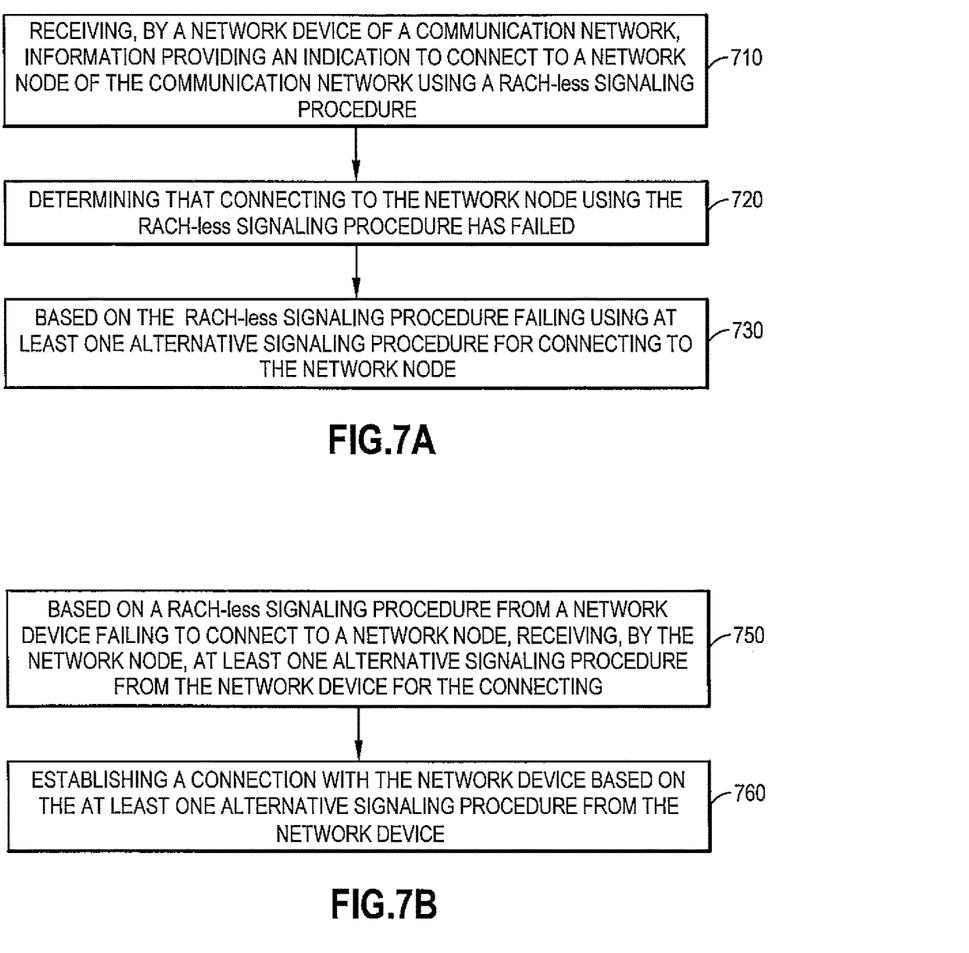
FIG. 7A and FIG. 7B each show a method in accordance with example embodiments of the invention which may be performed by an apparatus.

FIG. 7A illustrates operations in accordance with example embodiments of the invention which may be performed by a network device such as, but not limited to, a UE 110 as in FIG. 6. As shown in step 710 of FIG. 7A there is receiving, by a network device of a communication network, information providing an indication to connect to a network node of the communication network using a RACH-less signaling procedure As shown in step 720 of FIG. 7A there is determining that connecting to the network node using the RACH-less signaling procedure has failed. Then as shown in step 730 of FIG. 7A there is based on the RACH-less signaling procedure failing using at least one alternative signaling procedure for connecting to the network node.

In accordance with the example embodiments as described in the paragraph above the information comprises information for performing a secondary cell group connection or a handover of the network device from one network node to another network node.

In accordance with the example embodiments as described in the paragraphs above, the network device is accessing the network node directly with RRCReconfigurationComplete in a RACH-less procedure.

In accordance with the example embodiments as described in the paragraph above, there is receiving information providing an indication to connect to a network node of the communication network using the RACH-less signaling procedure.

In accordance with the example embodiments as described in the paragraphs above, the information comprises information for performing a secondary cell group connection or a handover of the network device from one network node to another network node.

In accordance with the example embodiments as described in the paragraphs above, the alternative signaling procedure comprises one of: a two-step RACH procedure, or a four-step RACH procedure; and wherein at least one dedicated uplink grant assigned to the RACH-less signaling procedure is re-used for the alternative signaling procedure.

In accordance with the example embodiments as described in the paragraphs above, there is determining at least one dedicated uplink grant based on one of: an indication of the at least one dedicated uplink grant in the information from at least one of a currently connected network node, or monitoring by the network device of packet data control channel data of the network node for the at least one dedicated uplink grant.

In accordance with the example embodiments as described in the paragraphs above, there is, based on the information providing the indication to connect to the network node, starting at least one timer comprising at least one of a timer controlling time to success of the handover or the secondary cell group connection; and starting a new timer T or counter, wherein the handover or secondary cell group connection expiry timer and the new timer T or counter are run in parallel, wherein the at least one timer comprises a reconfiguration with sync failure expiry timer and a T304 timer for at least one of the handover or the secondary cell group connection and the new timer T or counter, and wherein the reconfiguration with sync failure expiry timer and the new timer T or counter are run in parallel.

In accordance with the example embodiments as described in the paragraphs above, the RACH-less signaling procedure is determined to have failed based on at least one of: expiration of the at least one timer before the RACH-less signaling procedure is completed, or expiration of a predetermined time duration for use of at least one dedicated uplink grant assigned to the RACH-less signaling procedure, signaling procedure has exceeded a pre-configured number of trials on at least one dedicated uplink grant for the connecting, or based on a predetermined number of RRCReconfigurationComplete retransmissions for the RACH-less signaling procedure being exceeded.

In accordance with the example embodiments as described in the paragraphs above, a duration of the new timer T is received in one of the information or a system information block.

In accordance with the example embodiments as described in the paragraphs above, the new timer T is set with a shorter expiration time than the reconfiguration sync failure expiry timer.

In accordance with the example embodiments as described in the paragraphs above, there is, based on the RACH-less signaling procedure failing, the alternative signaling procedure is reusing UL resources comprising at least one dedicated uplink grant assigned to the RACH-less procedure for transmitting a physical random access channel preamble associated with the at least one alternative signaling procedure to the network node.

In accordance with the example embodiments as described in the paragraphs above, the reuse of the at least one dedicated uplink grant assigned to the RACH-less signaling procedure for transmitting the physical random access channel preamble is enabling contention free random access by the network device to the network node.

In accordance with the example embodiments as described in the paragraphs above, the at least one dedicated uplink grant is reused without further rules for associating the at least one dedicated uplink grant with at least one of a random access preamble or a contention-based random access preamble.

A non-transitory computer-readable medium (Memory(ies) 125 as in FIG. 6) storing program code (Computer Program Code 123 as in FIG. 6), the program code executed by at least one processor (Processor(s) 120, RACH Module 140-1, and/or RACH Module 140-2 as in FIG. 6) to perform the operations as at least described in the paragraphs above.

In accordance with an example embodiment of the invention as described above there is an apparatus comprising: means for receiving (one or more transceivers 130, Memory(ies) 125, Computer Program Code 123, and Processor(s) 120, RACH Module 140-1, and/or RACH Module 140-2 as in FIG. 6), by a network device (UE 110 as in FIG. 6) of a communication network (network 100 as in FIG. 6), information providing an indication to connect to a network node RAN node 170 and/or RAN node 90 as in FIG. 6) of the communication network using a RACH-less signaling procedure; means for determining (Memory(ies) 125, Computer Program Code 123, and Processor(s) 120, RACH Module 140-1, and/or RACH Module 140-2 as in FIG. 6), by a network device (UE 110 as in FIG. 6) that connecting to the network node using the RACH-less signaling procedure has failed; and means, based on the RACH-less signaling procedure failing, using (Memory(ies) 125, Computer Program Code 123, and Processor(s) 120, RACH Module 140-1, and/or RACH Module 140-2 as in FIG. 6) at least one alternative signaling procedure, for connecting (one or more transceivers 130, Memory(ies) 125, Computer Program Code 123, and Processor(s) 120, RACH Module 140-1, and/or RACH Module 140-2 as in FIG. 6), by a network device (UE 110 as in FIG. 6) to the network node.

In the example aspect of the invention according to the paragraph above, wherein at least the means for receiving, determining, and connecting comprises a non-transitory computer readable medium [Memory(ies) 125 as in FIG. 6] encoded with a computer program [Computer Program Code 123 as in FIG. 6] executable by at least one processor [Processor(s) 120, RACH Module 140-1, and/or RACH Module 140-2 as in FIG. 6].

FIG. 7B illustrates operations in accordance with example embodiments of the invention which may be performed by a network node such as, but not limited to, a gNB 170 and/or a gNB 90 as in FIG. 6. As shown in step 750 of FIG. 7B there is, based on a RACH-less signaling procedure from a network device failing to connect to a network node, receiving, by the network node, at least one alternative signaling procedure from the network device for the connecting. Then as shown in step 760 of FIG. 7B there is establishing a connection with the network device based on the at least one alternative signaling procedure from the network device.

In accordance with the example embodiments as described in the paragraph above, the signaling procedure uses information for performing a secondary cell group connection or a handover of the network device from one network node to another network node.

In accordance with the example embodiments as described in the paragraphs above, the at least one alternative signaling procedure comprises at least one of a two-step RACH procedure, or a four-step RACH procedure.

In accordance with the example embodiments as described in the paragraphs above, wherein at least one dedicated uplink grant configured for the RACH-less signaling procedure is reused for communicating a physical random access channel preamble for a random access occasion with the network node.

In accordance with the example embodiments as described in the paragraphs above, the at least one dedicated uplink grant is reused without further rules for associating the at least one dedicated uplink grant with at least one of the random access preamble or a contention-based random access preamble.

In accordance with the example embodiments as described in the paragraphs above, the RACH-less signaling procedure failing is based on at least one of: expiration of at least one timer before the RACH-less signaling procedure is completed, or expiration of a predetermined time duration for use of at least one dedicated uplink grant assigned to the RACH-less signaling procedure, RACH-less signaling procedure has exceeded a pre-configured number of trials on at least one dedicated uplink grant for the connecting, or based on a predetermined number of RRCReconfigurationComplete retransmissions for the RACH-less signaling procedure being exceeded.

A non-transitory computer-readable medium (Memory(ies) 155 or Memory(ies) 71 as in FIG. 6) storing program code (Computer Program Code 153 or Computer Program Code 73 as in FIG. 6), the program code executed by at least one processor (Processor(s) 152, Processor(s) 75, RACH Module 150-1, RACH Module 150-2, RACH Module 50-1, and/or RACH Module 50-2 as in FIG. 6) to perform the operations as at least described in the paragraphs above.

In accordance with an example embodiment of the invention as described above there is an apparatus comprising: means, based on a RACH-less signaling procedure from a network device failing to connect to a network node, for receiving (transceivers 160 or N/W I/F(s)) 80, Memory(ies) 155 or Memory(ies) 71, Computer Program Code 153 or Computer Program Code 73, and Processor(s) 152, Processor(s) 75, RACH Module 150-1, RACH Module 150-2, RACH Module 50-1, and/or RACH Module 50-2 as in FIG. 6), by the network node, at least one alternative signaling procedure from the network device for the connecting. Then means for establishing (transceivers 160 or N/W I/F(s)) 80, Memory(ies) 155 or Memory(ies) 71, Computer Program Code 153 or Computer Program Code 73, and Processor(s) 152, Processor(s) 75, RACH Module 150-1, RACH Module 150-2, RACH Module 50-1, and/or RACH Module 50-2 as in FIG. 6) a connection with the network device based on the at least one alternative signaling procedure from the network device.

In the example aspect of the invention according to the paragraph above, wherein at least the means for receiving and establishing comprises a non-transitory computer readable medium [Memory(ies) 155 or Memory(ies) 71 as in FIG. 6] encoded with a computer program [Computer Program Code 153 or Computer Program Code 73 as in FIG. 6] executable by at least one processor [Processor(s) 152, Processor(s) 75, RACH Module 150-1, RACH Module 150-2, RACH Module 50-1, and/or RACH Module 50-2 as in FIG. 6].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
receiving, by a network device of a communication network, a message providing an indication to connect to a network node of the communication network using a Random Access Channel (RACH)-less) signaling procedure;
determining that connecting to the network node using the RACH-less signaling procedure has failed; and
based on the RACH-less signaling procedure failing, using at least one alternative signaling procedure for connecting to the network node, wherein the at least one alternative signaling procedure is reusing Uplink (UL) resources comprising at least one dedicated uplink grant assigned to the RACH-less procedure for transmitting a physical random access channel preamble associated with the at least one alternative signaling procedure to the network node.

2. The method of claim 1, wherein the message comprises information for performing a secondary cell group connection or a handover of the network device from one network node to another network node.

3. The method according to claim 2, comprising determining the at least one dedicated uplink grant based on one of:
an indication of the at least one dedicated uplink grant in the message from at least one of a currently connected network node, or
monitoring by the network device of packet data control channel data of the network node for the at least one dedicated uplink grant.

4. The method of claim 1, wherein the message comprises information for performing a secondary cell group connection from the network device to the network node.

5. The method according to claim 1, wherein the alternative signaling procedure comprises one of:
a two-step RACH procedure, or
a four-step RACH procedure.

6. The method according to claim 1, comprising:
based on the message,
starting at least one timer controlling time to success of the handover or the secondary cell group connection; and
starting a new timer T,
wherein the at least one timer and the new timer T are run in parallel, and
wherein the RACH-less signaling procedure is determined to have failed based on at least one of:
expiration of the at least one timer before the RACH-less signaling procedure is completed, or
expiration of a predetermined time duration for use of at least one dedicated uplink grant assigned to the RACH-less signaling procedure, or
the RACH-less signaling procedure has exceeded a pre-configured number of trials on at least one dedicated uplink grant for the connecting, or
based on a predetermined number of RRCReconfigurationComplete retransmissions for the RACH-less signaling procedure being exceeded.

7. The method of claim 6, wherein a duration of the new timer T is received in one of the message or a system information block.

8. The method of claim 6, wherein the new timer T is set with a shorter expiration time than the reconfiguration with sync failure expiry timer.

9. The method of claim 1, wherein the reuse of the at least one dedicated uplink grant assigned to the RACH-less signaling procedure for transmitting the physical random access channel preamble is enabling contention free random access by the network device to the network node.

10. The method of claim 1, wherein the at least one dedicated uplink grant is reused without further rules for associating the at least one dedicated uplink grant with at least one of a random access preamble or a contention-based random access preamble.

11. A non-transitory computer-readable medium storing program code, the program code executed by at least one processor to perform the method of claim 1.

12. An apparatus comprising:
at least one processor; and
at least one memory including computer program code, where the at least one memory and the computer program code are configured, with the at least one processor, to cause the apparatus to at least:
receive, by a network device of a communication network, a message providing an indication to connect to a network node of the communication network using a Random Access Channel (RACH)-less) signaling procedure;
determine that connecting to the network node using the RACH-less signaling procedure has failed; and
based on the RACH-less signaling procedure failing, use at least one alternative signaling procedure for connecting to the network node wherein the at least one alternative signaling procedure is reusing Uplink (UL) resources comprising at least one dedicated uplink grant assigned to the RACH-less procedure for transmitting a physical random access channel preamble associated with the at least one alternative signaling procedure to the network node.

13. The apparatus of claim 12, wherein the message comprises information for performing a secondary cell group connection or a handover of the network device from one network node to another network node.

14. The apparatus claim 13, wherein the at least one memory including the computer program code is configured with the at least one processor to cause the apparatus to:
determine the at least one dedicated uplink grant based on one of:
an indication of the at least one dedicated uplink grant in the message from at least one of a currently connected network node, or
monitoring by the network device of packet data control channel data of the network node for the at least one dedicated uplink grant.

15. The apparatus according to claim 13, wherein the at least one memory including the computer program code is configured with the at least one processor to cause the apparatus to:
based on the message,
start at least one timer controlling time to success of the handover or the secondary cell group connection; and
start a new timer T,
wherein the at least one timer and the new timer T run in parallel, and
wherein the RACH-less signaling procedure is determined to have failed based on at least one of:
expiration of the at least one timer before the RACH-less signaling procedure is completed, or
expiration of a predetermined time duration for use of at least one dedicated uplink grant assigned to the RACH-less signaling procedure, or the RACH-less signaling procedure has exceeded a pre-configured number of trials on at least one dedicated uplink grant for the connecting, or based on a predetermined number of RRCReconfigurationComplete retransmissions for the RACH-less signaling procedure being exceeded.

16. The apparatus of claim 15, wherein a duration of the new timer T is received in one of the message or a system information block.

17. The apparatus of claim 15, wherein the new timer T is set with a shorter expiration time than the reconfiguration with sync failure expiry timer.

18. The apparatus of claim 12, wherein the message comprises information for performing a secondary cell group connection from the network device to the network node.

19. The apparatus according to claim 12, wherein the alternative signaling procedure comprises one of:
a two-step RACH procedure, or
a four-step RACH procedure.

20. The apparatus of claim 12, wherein the reuse of the at least one dedicated uplink grant assigned to the RACH-less signaling procedure for transmitting the physical random access channel preamble is enabling contention free random access by the network device to the network node.

21. The apparatus of claim 12, wherein the at least one dedicated uplink grant is reused without further rules for associating the at least one dedicated uplink grant with at least one of a random access preamble or a contention-based random access preamble.

22. A method, comprising:
based on a Random Access Channel (RACH)-less signaling procedure from a network device failing to connect to a network node, receiving, by the network node, at least one alternative signaling procedure from the network device for the connecting; and
establishing a connection with the network device based on the at least one alternative signaling procedure from the network device, wherein the at least one alternative signaling procedure is reusing Uplink (UL) resources comprising at least one dedicated uplink grant assigned to the RACH-less signaling procedure for transmitting a physical random access channel preamble associated with the at least one alternative signaling procedure to the network node.

23. The method of claim 22, wherein the RACH-less signaling procedure uses information for performing a secondary cell group connection or a handover of the network device from one network node to another network node.

24. The method according to claim 22, wherein the at least one alternative signaling procedure comprises at least one of:
a two-step RACH procedure, or
a four-step RACH procedure.

25. The method of claim 22, wherein the at least one dedicated uplink grant is reused without further rules for associating the at least one dedicated uplink grant with at least one of the random access preamble or a contention-based random access preamble.

26. The method of claim 22, wherein the RACH-less signaling procedure failing is based on at least one of:
expiration of at least one timer before the RACH-less signaling procedure is completed, or
expiration of a predetermined time duration for use of at least one dedicated uplink grant assigned to the RACH-less signaling procedure,
the RACH-less signaling procedure has exceeded a pre-configured number of trials on at least one dedicated uplink grant for the connecting, or
based on a predetermined number of RRCReconfigurationComplete retransmissions for the RACH-less signaling procedure being exceeded.

27. A non-transitory computer-readable medium storing program code, the program code executed by at least one processor to perform the method of claim 22.

28. An apparatus comprising:
at least one processor; and
at least one memory including computer program code, where the at least one memory and the computer program code are configured, with the at least one processor, to cause the apparatus to at least:
based on a Random Access Channel (RACH)-less signaling procedure from a network device failing to connect to a network node, receive, by the network node, at least one alternative signaling procedure from the network device for the connecting, wherein the at least one alternative signaling procedure is reusing Uplink UL resources comprising at least one dedicated uplink grant assigned to the RACH-less signaling procedure for transmitting a physical random access channel preamble associated with the at least one alternative signaling procedure to the network node; and
establish a connection with the network device based on the at least one alternative signaling procedure from the network device.

29. The apparatus of claim 28, wherein the RACH-less signaling procedure uses information for performing a secondary cell group connection or a handover of the network device from one network node to another network node.

30. The apparatus according to claim 28, wherein the at least one alternative signaling procedure comprises at least one of:
a two-step RACH procedure, or
a four-step RACH procedure.

31. The apparatus of claim 28, wherein the at least one dedicated uplink grant is reused without further rules for associating the at least one dedicated uplink grant with at least one of the random access preamble or a contention-based random access preamble.

32. The apparatus of claim 28, wherein the RACH-less signaling procedure failing is based on at least one of:
expiration of at least one timer before the RACH-less signaling procedure is completed, or
expiration of a predetermined time duration for use of at least one dedicated uplink grant assigned to the RACH-less signaling procedure,
the RACH-less signaling procedure has exceeded a pre-configured number of trials on at least one dedicated uplink grant for the connecting, or
based on a predetermined number of RRCReconfigurationComplete retransmissions for the RACH-less signaling procedure being exceeded.

* * * * *